Nov. 30, 1965  A. J. MÜLLER  3,220,502
WHEEL SUSPENSION IN VEHICLES
Filed Nov. 15, 1960  5 Sheets-Sheet 1

INVENTOR.
ALF JOHN MÜLLER
BY
ATTORNEYS

Nov. 30, 1965 A. J. MÜLLER 3,220,502
WHEEL SUSPENSION IN VEHICLES
Filed Nov. 15, 1960 5 Sheets-Sheet 2

INVENTOR.
ALF JOHN MÜLLER
BY
Dicke, Craig & Freudenberg
ATTORNEYS

Nov. 30, 1965  A. J. MÜLLER  3,220,502
WHEEL SUSPENSION IN VEHICLES
Filed Nov. 15, 1960  5 Sheets-Sheet 3

INVENTOR.
ALF JOHN MÜLLER
BY
ATTORNEYS

Nov. 30, 1965     A. J. MÜLLER     3,220,502

WHEEL SUSPENSION IN VEHICLES

Filed Nov. 15, 1960     5 Sheets-Sheet 4

INVENTOR.
ALF JOHN MÜLLER
ATTORNEYS

United States Patent Office 3,220,502
Patented Nov. 30, 1965

3,220,502
WHEEL SUSPENSION IN VEHICLES
Alf John Müller, Stuttgart-Bad Cannstatt, Germany, assignor to Daimler-Benz Aktiengesellschaft, Stuttgart-Unterturkheim, Germany
Filed Nov. 15, 1960, Ser. No. 69,373
Claims priority, application Germany, Nov. 17, 1959,
D 31,901
13 Claims. (Cl. 180—73)

The present invention relates to a wheel suspension, and more particularly to a swinging half-axle arrangement in vehicles, especially motor vehicles.

The present invention essentially consists in locating the geometric pivot point of one swinging half-axle in the vertical transverse plane of the vehicle extending through the wheel centers at a point beyond the vehicle center on the other side of the vertical longitudinal center plane of the vehicle whereas the other swinging half-axle is pivotally mounted or secured within the area of this center longitudinal plane at the first-mentioned swinging half-axle. In this manner, the advantages of relatively long, swinging half-axles extending beyond the vehicle center are achieved with the smallest possible structural expenditures. Such types of swinging half-axles produce during deflections or spring movements of the wheels considerably smaller changes in camber and wheel tread than swinging half-axles which extend only to the vehicle center or not even up to the vehicle center. These advantages are obtained in accordance with the present invention for both swinging half-axles even though, physically considered, one of the swinging half-axles extends only up to the vehicle center.

Exactly symmetrical deflections or swinging movements of both swinging half-axles are attained in accordance with the present invention if the pivot point of the second-mentioned half-axle is disposed on the geometric axis of the first-mentioned swinging half-axle.

In particular, the arrangement may be made in accordance with the present invention in such a manner that the geometric pivot axis of the first-mentioned swinging half-axle extends through the joint at the vehicle superstructure of a longitudinal guide member rigidly connected with the wheel carrier and possibly constructed as leaf spring and through a further joint provided at the vehicle superstructure. It is thereby further proposed in accordance with another feature of the present invention that the aforementioned further joint provided at the vehicle superstructure is the first one of two joints by means of which the axle gear housing that is rotatable about the geometric axis of the swinging half-axle coordinated thereto is supported at the vehicle superstructure whereby the first one of these two joints is swingingly secured at the vehicle superstructure by means of a connecting member extending approximately in the vertical direction. In order that the transmission of torque or driving force from the driving engine to the swinging half-axle be impaired as little as possible by the movements of the axle gear housing, it is additionally recommended in accordance with the present invention to pass the geometric swinging axis of the axle gear housing at least approximately through a universal joint which connects the cardan shaft with the drive shaft within the axle gear housing.

According to a modified embodiment of the present invention, the swinging movements of the first-mentioned swinging half-axle are determined, on the one hand, by the guidance of the wheel carrier on a so-called Watt-type double swinging assembly, i.e., by a guide assembly composed of forwardly and rearwardly extending guide members spaced from each other in the vertical direction, and, on the other, by a structural part, particularly constructed as axle gear housing, which is rotatable about this swinging half-axle and pivotally secured at the vehicle superstructure, and also the second-mentioned swinging half-axle is guided with the aid of a so-called Watt-type double swinging assembly, i.e., by a guide assembly composed of forwardly and rearwardly extending guide members spaced vertically from each other. It is thereby proposed in particular in accordance with the present invention that the axle gear housing rotatable about the swinging half-axle is supported in two joints at the vehicle superstructure whereby both joints are pivotally secured in a swinging manner at the vehicle by means of vertically extending connecting members and the geometric swinging axis extending through both joints extends at least approximately through a universal joint connecting the cardan shaft with the drive shaft within the axle gear housing. Such an arrangement may be appropriately combined in accordance with the present invention with a curve stabilizer in such a manner that two arms of the Watt-type double swinging assembly which are disposed on mutually opposite sides of the vehicle are connected with each other by a torsion rod.

Accordingly, it an object of the present invention to provide a wheel suspension, and more particularly a swinging half-axle wheel suspension which entails the advantages normally obtained only with relatively long swinging half-axles extending beyond the center of the vehicle while at the same time obviating the necessity for physically constructing both swinging half-axles of such length.

Still another object of the present invention resides in the provision of a swinging half-axle arrangement for vehicles, especially motor vehicles, in which the geometric arrangement and location of the pivot axes are so arranged that the swinging half-axles perform as if both were longer than the distance from the wheel carrier to the vehicle center without, in fact, requiring such physical length for both.

Still another object of the present invention resides in the provision of a wheel suspension for swinging half-axles in which the camber changes as well as changes in wheel tread during wheel deflections or spring movements are considerably smaller than would be the case with swinging half-axles of conventional construction having the same physical length as those of the present invention.

Still a further object of the present invention resides in the provision of a swinging half-axle suspension for vehicles in which the physical length of the two swinging half-axles are different from each other yet permit exactly symmetrical spring deflections of both swinging half-axles during spring movements of the wheels.

These and other objects, features and advantages of the present invention will become more obvious from the following description when taken in connection with the accompanying drawing which shows, for purposes of illustration only, several embodiments in accordance with the present invention, and wherein FIGURE 1 is an end view of a rear axle for a motor vehicle in accordance with the present invention, illustrating a kinematically very simple construction of the present invention;

Figure 1:
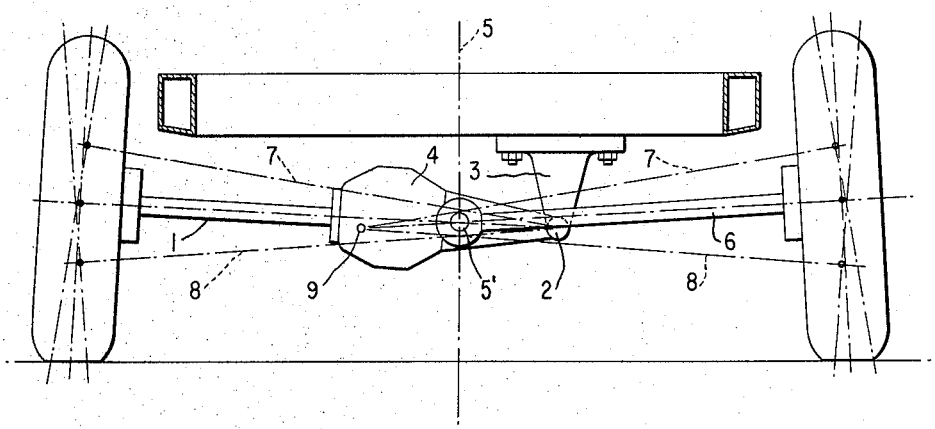
Figure 2:
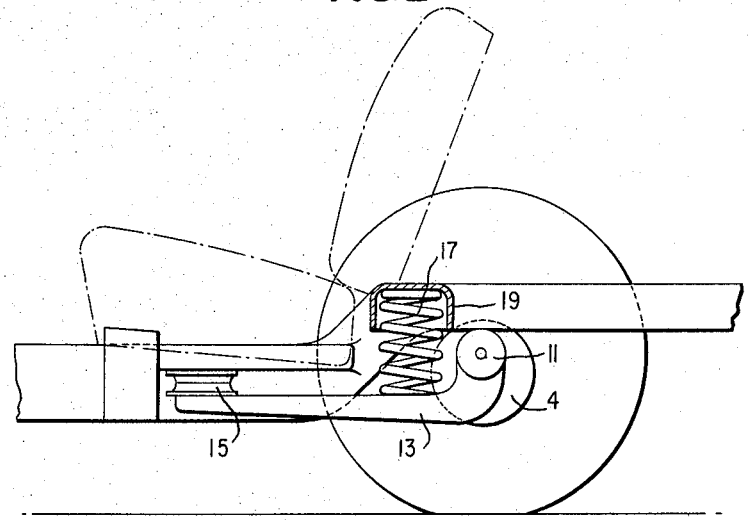
FIGURE 2 is a side view of a modified embodiment in accordance with the present invention in which the wheels swing about geometric axes extending obliquely to the driving direction.

Referring now to the drawing wherein like reference numerals are used throughout the various views to designate corresponding parts, and more particularly to FIGURE 1, the tubular member of the left swinging half-axle is designated therein by reference numeral 1 which is pivotally secured at joint 2 to a bracket 3 rigidly connected with the vehicle superstructure such as the vehicle frame, chassis or body of a self-supporting type body. The term vehicle superstructure will be used herein and in the claims to designate the relatively fixed or stationary vehicle part as normally constituted by the frame, chassis frame or body frame constituted, for instance, by a self-supporting type body construction. The axle gear housing 4 also swings in unison with the axle tube 1. The right swinging half-axle tubular member 6 is secured by joint 5' at the left swinging half-axle assembly 1, 4 within the vertical vehicle longitudinal center plane 5.

In order to illustrate the movements which the wheels carry out when passing over a transversely extending elevation or trough in the vehicle road, there have been shown in FIGURE 1 in dot and dash line the corresponding axle positions 7 and 8 thereof. It will be readily seen from FIGURE 1 that the right swinging half-axle 6 pivots about a virtual pivot point 9 stationary, in effect, on the vehicle superstructure which pivot point 9 is disposed exactly symmetrically to the actually present joint 2. There is also achieved by the present invention an arrangement in which the right wheel also possesses, kinematically speaking, a pivot or swinging radius extending beyond the vehicle center and therewith also entails the advantages of a smaller change in camber and wheel tread as would normally be obtainable with such an arrangement even though the right swinging half-axle 6 is, in fact, shorter and therewith of less weight and less costly.

Figure 12:
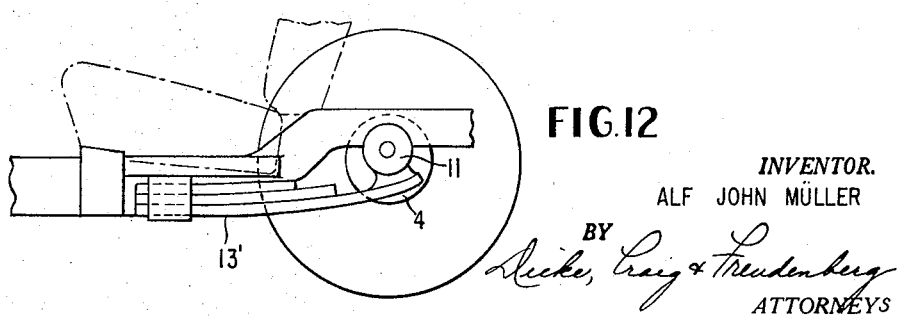
FIGURE 12 is a side view similar to FIGURE 2, of a further modification in accordance with the present invention.
Figure 3:
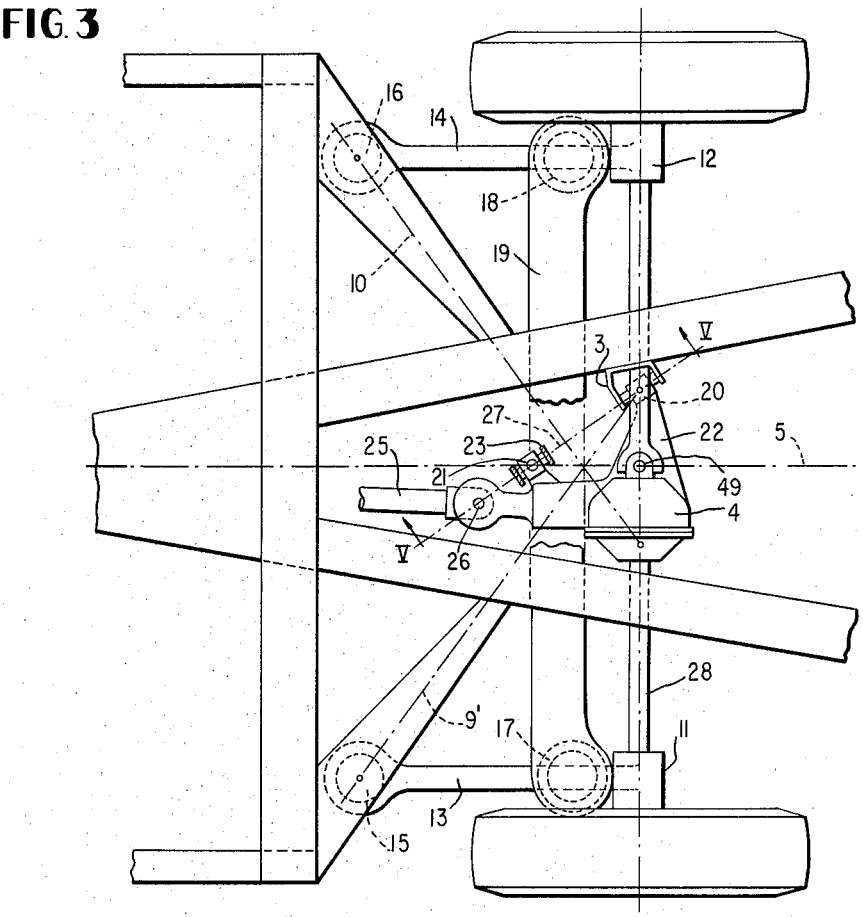
FIGURE 3 is a plan view of the suspension arrangement of FIGURE 2.
Figure 4:
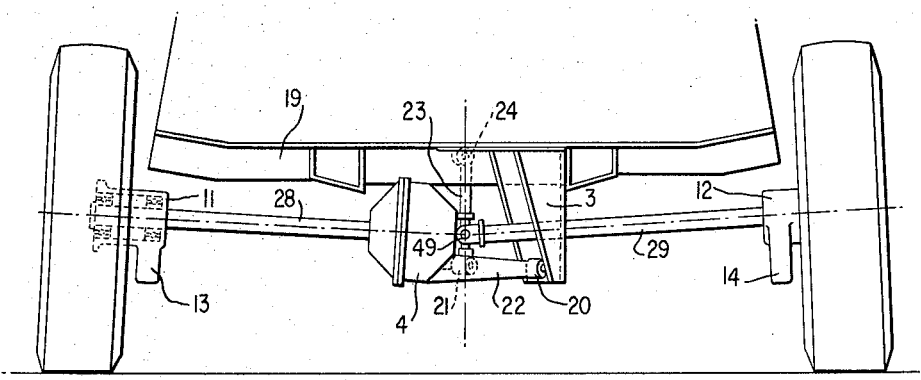
FIGURE 4 is a rear elevational view of the wheel suspension illustrated in FIGURES 2 and 3.
Figure 8:
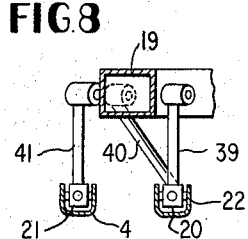
FIGURE 8 is a cross sectional view taken along line VIII—VIII of FIGURE 6.
Figure 5:
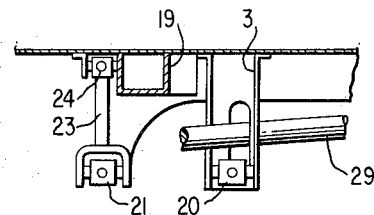
FIGURE 5 is a cross sectional view taken along line V—V of FIGURE 3.
Figure 6:
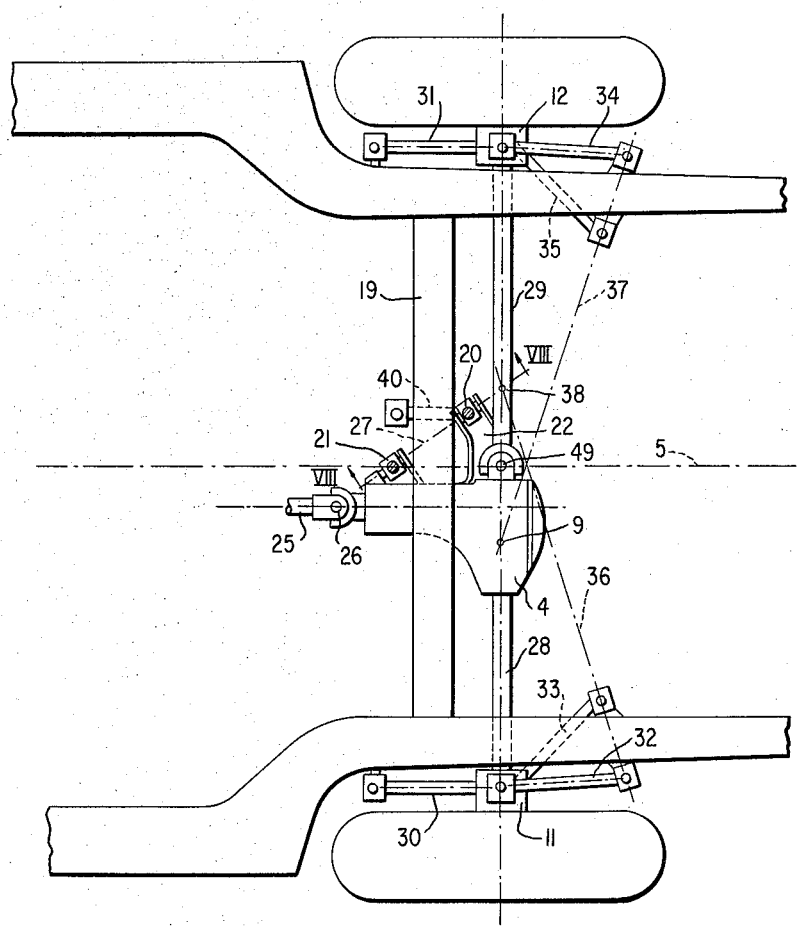
FIGURE 6 is a plan view of still a further modified embodiment of a wheel suspension in accordance with the present invention in which the wheels are guided by so-called Watt-type double swinging assemblies.
Figure 7:
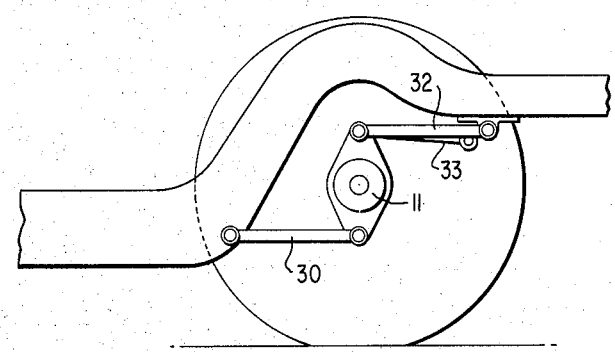
FIGURE 7 is a side elevational view of the modified embodiment of the wheel suspension of FIGURE 6.
Figure 9:
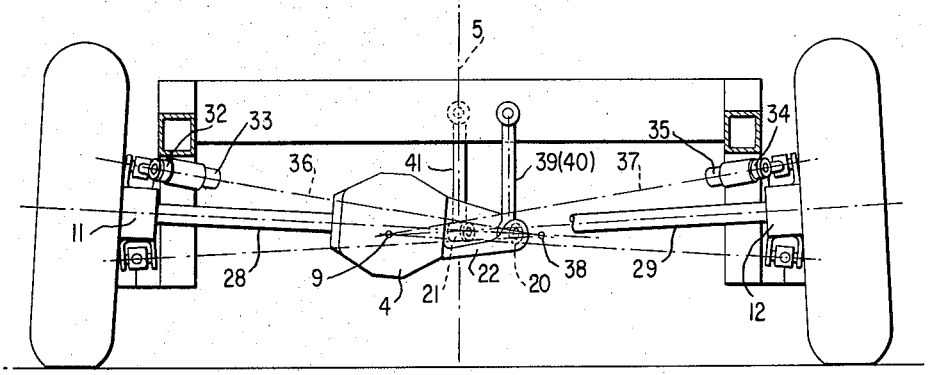
FIGURE 9 is a rear elevational view of the wheel suspension of FIGURES 6 and 7.

In the embodiment of FIGURES 2 to 5, the same goal is achieved as in FIGURE 1, and more particularly with a wheel suspension provided with geometric pivot axes 9' and 10 of the wheels (FIGURE 3) extending obliquely to the driving direction. The wheel carriers 11 and 12 are rigidly connected with the longitudinal guide members 13 and 14 which in turn are suitably mounted by means of rubber joints 15 and 16 at the vehicle superstructure. The support springs 17 and 18 are located between the guide members 13 and 14, on the one hand, and a frame cross bearer member 19, on the other. The axle gear housing 4 is pivotally secured by means of two rubber joints 20 and 21 at the frame or vehicle superstructure whereby the joint 20 is located between a bracket 3 (FIGURES 3, 4 and 5) rigidly secured to the vehicle superstructure and an arm 22 secured in any suitable manner at the axle gear housing 4 whereas the joint 21 is arranged between the axle gear housing 4 and a vertical connecting member 23 which, in turn, is pivotally secured at the frame cross bearer member at 24 within a rubber joint of suitable known construction. The arrangement of FIGURE 12 is similar to that of FIGURES 2 to 5 in most respects with, however, the substitution of leaf springs 13' for the guide members 13 and 14 and support springs 17 and 18.

The drive in the embodiment of FIGURES 2 through 5 takes place by means of a cardan shaft 25 which is operatively connected by means of a universal joint 26 with the drive shaft in the axle gear housing 4. The geometric pivot axis 27 of the axle gear housing 4 which extends through the rubber joints 20 and 21 also extends at least approximately through the universal joint 26. The axle drive shaft 28 for the left rear wheel is supported within the wheel carrier 11 and within the axle gear housing 4 against longitudinal displacement i.e., against axial movement relative thereto. The right rear wheel is driven by an axle drive shaft 29 which is operatively connected with the drive within housing 4 by means of a universal joint 49. The drive shaft 29 also has to be so arranged and mounted as not to be displaceable in the axial direction thereof relative to the axle gear housing 4 and the wheel carrier 12 since the axle drive shafts 28 and 29 together with the longitudinal guide members 13 and 14 take over the guidance of the wheels.

In contradistinction thereto, the wheel carriers 11 and 12 are guided in the embodiment of FIGURES 6 through 9 by so-called Watt-type double swinging assemblies so that the support of the shafts 28 and 29 may permit of relative longitudinal displaceabilities thereof in the axial direction. The single lower guide arms are designated in FIGURES 6 through 9 by reference numerals 30 and 31 whereas reference numerals 32 and 33 and reference numerals 34 and 35 designate the double upper arms of the Watt-type double swinging assemblies which also absorb the transverse forces. The geometric axes 36 and 37 which extend through the joints located at the vehicle superstructure for the arms 32 and 33 and for the arms 34 and 35 are directed toward the virtual pivot points 38 and 9 of the left and right swinging half axles 28 and 29. As is particularly clearly visible from FIGURE 8, the rubber joint 20 is so pivotally secured by means of two arms 39 and 40 at the frame cross bearer member 19 that it may swing or pivot in the vehicle transverse direction. An arm 41 connected with the frame cross bearer member 19 within a rubber joint enables the rubber joint 21 to carry out swinging movements also in the vehicle longitudinal direction.

Figure 10:
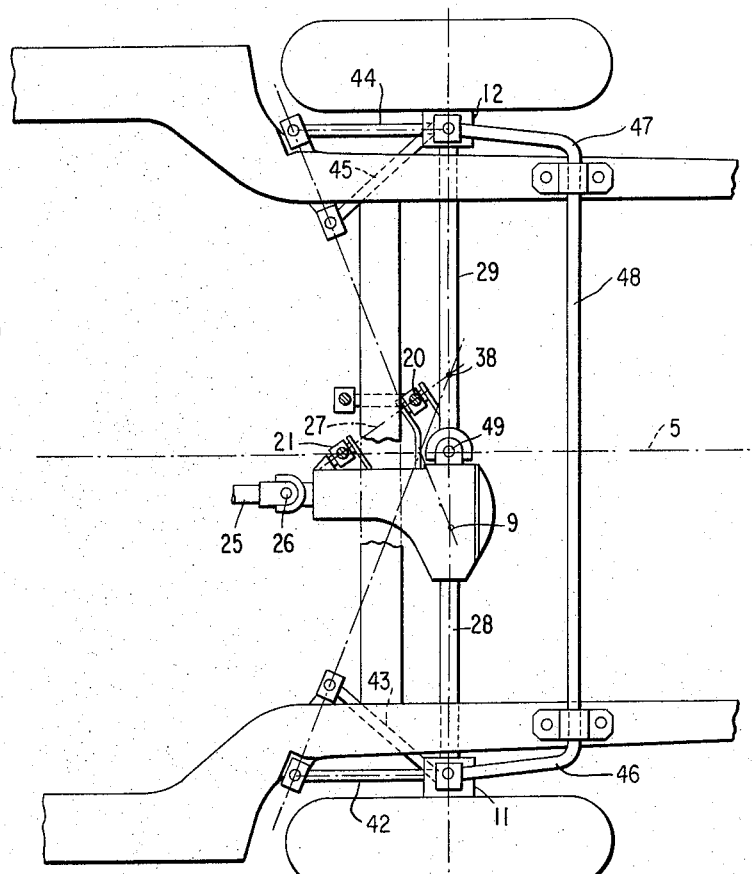
FIGURE 10 is a top plan view of still a further modified embodiment of a wheel suspension for swinging half-axles in which the guide members of the Watt-type double swinging assembly are connected by means of a stabilizer torsion rod.
Figure 11:
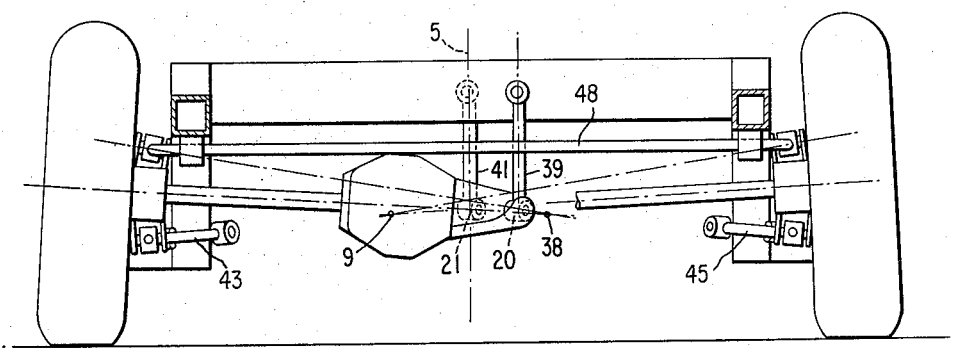
FIGURE 11 is a rear elevational view of the wheel suspension illustrated in FIGURE 10.

FIGURES 10 and 11 illustrate a modified embodiment, very similar to that of FIGURES 6 through 9, in which, however, the lower arms 42 and 43 and the lower arms 44 and 45 of the Watt-type double swinging assembly are of double construction while the upper arms 46 and 47 of which only one each is present are connected with each other by a torsion rod 48 whereby a stabilizer is provided in a most simple manner.

While I have shown and described several embodiments in accordance with the present invention, it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

I claim:

1. A swinging half-axle arrangement for the wheels of vehicles, especially motor vehicles, having a vehicle superstructure, comprising swinging half-axle means including axle gear housing means and wheel carrier means for the wheel on each side of the vehicle, longitudinal guide means rigidly secured to each said wheel carrier means and including joint means at said vehicle superstructure for guidingly connecting each wheel carrier means at said vehicle superstructure, first means effectively providing the swinging axis for one of said half-axle means, said axle gear housing means being supported by said superstructure at two points, one of said two points comprising further joint means at said vehicle superstructure arranged essentially on the vertical transverse vehicle plane extending through the wheel centers on the other side of the vehicle longitudinal center plane and effectively providing a geometric pivot point for one of the half-axle means, and second joint means effectively providing a geometric pivot point for the other of said swinging half-axle means adjacent the vertical vehicle longitudinal center plane at said first-mentioned half-axle means, the geometric swinging axis of said first-mentioned swinging half-axle means extending through said further joint means and the first-mentioned joint means securing the longitudinal guide means associated with said one of the half-axle means to the vehicle superstructure.

2. A swinging half-axle arrangement according to claim 1, wherein said longitudinal guide means are constructed as leaf springs.

3. A swinging half-axle arrangement according to claim 1, wherein the pivot point of said second-mentioned half-axle means is disposed on the geometric axis of said first-mentioned half-axle means.

4. A swinging half-axle arrangement for the wheels of vehicles, especially motor vehicles, having a vehicle superstructure, comprising swinging half-axle means including axle gearing housing means and wheel carrier means for the wheel on each side of the vehicle, longitudinal guide means including joint means at said vehicle superstructure for guidingly connecting each wheel carrier means at said vehicle superstructure, first means effectively providing the swinging axis for one of said half-axle means including said axle gear housing means and further joint means including two joints for supporting said axle gear housing means from said superstructure, one of said two joints pivotally supporting said axle gear housing means on said vehicle superstructure to be rotatable about the swinging axis of said one of the swinging half-axle means coordinated thereto, and the other of said two joints being pivotally secured at said vehicle superstructure by a connecting member extending essentially in the vertical direction between said axle gear housing means and said superstructure, said one of the two joints being arranged essentially on the vertical transverse vehicle plane extending through the wheel centers on the side of the vehicle longitudinal center plane opposite to the wheel to which said half-axle means is connected, and second means effectively providing the swinging axis for the other swinging half-axle means including an additional joint means arranged adjacent the vertical vehicle longitudinal center plane at said first-mentioned half-axle means, the geometric swinging axis of said first-mentioned swinging half-axle means extending through said one of the two joints and the first-mentioned joint means securing the longitudinal guide means associated with said one of the half-axle means to the vehicle superstructure.

5. A swinging half-axle arrangement for the wheels of vehicles, especially motor vehicles, provided with a pair of oppositely disposed wheels and having a vehicle superstructure, drive shaft means, a cardan shaft, axle gear housing means and a universal joint connecting said cardan shaft with said drive shaft means within said axle gear housing means, comprising swinging half-axle means for the wheel on each side of the vehicle, wheel carrier means for each wheel operatively connected with a respective half-axle means, longitudinal guide means for guidingly connecting each wheel carrier means with said vehicle superstructure, first means effectively providing the swinging axis for one of said half-axle means including said axle gear housing means and means for supporting said axle gear housing means comprising two separate joint means for mounting said axle gear housing means, one of said two separate joint means being arranged essentially on the vertical transverse vehicle plane extending through the wheel centers and on the side of the vehicle longitudinal center plane opposite to the wheel operatively connected to said one of said half-axle means, the geometric swinging axis extending through said two separate joint means extending also substantially through said universal joint connecting the cardan shaft with the drive shaft within said axle gear housing means and also at an acute angle with respect to the swinging axis of said one of the half-axle means, and second means effectively providing the swinging axis for the other of said half-axle means including additional joint means providing a geometric pivot point for the other swinging half-axle means adjacent the vertical vehicle longitudinal center plane at said first-mentioned half-axle means, the swinging movements of said first-mentioned half-axle means being determined by the guidance of the respective longitudinal guide means and said axle gear housing means.

6. A swinging half-axle arrangement according to claim 5, wherein said longitudinal guide means are rigidly secured to each said wheel carrier means and resiliently mounted on said vehicle superstructure.

7. A swinging half-axle arrangement according to claim 5, wherein said longitudinal guide means includes longitudinal guide members on each side of the vehicle, and torsion rod means operatively connecting with each other two mutually opposite guide members.

8. A swinging half-axle arrangement according to claim 5, wherein said longitudinal guide means are of the Watt-type double swinging assembly including longitudinal guide members extending in the forward and rearward direction of the vehicle and spaced from each other in the vertical direction.

9. A swinging half-axle arrangement according to claim 8, further comprising torsion rod means interconnecting two oppositely disposed arms located on respective sides of the vehicle of said Watt-type swinging assemblies.

10. A swinging half-axle arrangement for the wheels of vehicles, especially motor vehicles, provided with a pair of oppositely disposed wheels and having a vehicle superstructure, drive shaft means, a cardan shaft, axle gear housing means and a universal joint connecting said cardan shaft with said drive shaft means within said axle gear housing means, comprising swinging half-axle means for the wheel on each side of the vehicle, wheel carrier means for each wheel operatively connected with a respective half-axle means, longitudinal guide means for guidingly connecting each wheel carrier means with said vehicle superstructure, first means effectively providing the geometric pivot point for one of said half-axle means essentially on the vertical transverse vehicle plane extending through the wheel centers and on the side of the vehicle longitudinal center plane opposite to the wheel operatively connected to said one of said half-axle means, second means effectively providing the geometric pivot point of the other swinging half-axle means within the area of said vehicle longitudinal center plane at said first-mentioned half-axle means, said first means including said axle gear housing means, the swinging movement of said first-mentioned half-axle means being determined by the guidance of the respective longitudinal guide means and said axle gear housing means, and two separate joint means for mounting said axle gear housing means at said superstructure, one of said joint means including an arm rigidly connected to said axle gear housing means and pivotally secured to said superstructure and the other of said joint means including an essentially vertical arm pivotally secured to both said axle gear housing means and to said superstructure, the geometric swinging axis extending through said pivotal connections of the two joint means at said axle gear housing means extending also substantially through said universal joint connecting the cardan shaft with the drive shaft within said axle gear housing and also at an acute angle with respect to the swinging axis of said one of said half-axle means.

11. A swinging half-axle arrangement according to claim 10, wherein said longitudinal guide means are rigidly secured to each said wheel carrier means and resiliently mounted on said vehicle superstructure.

12. A swinging half-axle arrangement according to claim 10, wherein said longitudinal guide means are of the Watt-type double swinging assembly including longitudinal guide members extending in the forward and rearward direction of the vehicle and spaced from each other in the vertical direction.

13. A swinging half-axle arrangement according to claim 12, further comprising torsion rod means interconnecting two oppositely disposed arms located on respective sides of the vehicle of said Watt-type swinging assemblies.

References Cited by the Examiner

UNITED STATES PATENTS

| | | | |
|---|---|---|---|
| 2,055,975 | 9/1936 | Haltenberger | 180—73 |
| 2,105,369 | 1/1938 | Paton | 180—73 |
| 2,806,542 | 9/1957 | Scherenberg et al. | 180—73 |
| 2,808,270 | 10/1957 | Muller | 180—73 X |
| 2,841,230 | 7/1958 | Neuschaefer et al. | 180—73 |
| 2,843,214 | 7/1958 | Muller | 180—73 |
| 2,854,087 | 9/1958 | Scherenberg | 180—73 |
| 2,911,052 | 11/1959 | Olley | 180—73 |
| 2,968,358 | 1/1961 | DeLorean | 180—73 |
| 2,983,328 | 5/1961 | Ewert | 180—73 |
| 3,064,749 | 11/1962 | Muller | 180—73 |

FOREIGN PATENTS 1,027,075  3/1958  Germany.

A. HARRY LEVY, *Primary Examiner.*

PHILIP ARNOLD, *Examiner.*